Jan. 5, 1971  J. W. LUNDSTROM ET AL  3,553,573
SYSTEM FOR MOISTURE MEASUREMENT AT MICROWAVE FREQUENCIES
Filed Sept. 7, 1967

INVENTORS
JOHN W. LUNDSTROM
MARSTON D. MOSTELLER
BY
Forrest J. Lilly
ATTORNEY

United States Patent Office 3,553,573
Patented Jan. 5, 1971

3,553,573
SYSTEM FOR MOISTURE MEASUREMENT AT
MICROWAVE FREQUENCIES
John W. Lundstrom, 603 N. Crestview Drive, Glendora,
Calif. 91740, and Marston D. Mosteller, 25084 5th
St., San Bernardino, Calif. 92410
Filed Sept. 7, 1967, Ser. No. 666,146
Int. Cl. G01r 27/04
U.S. Cl. 324—58.5                                8 Claims

ABSTRACT OF THE DISCLOSURE

Apparatus for determining the moisture content of granular materials such as wet wood chips or other low dielectric, cellulose based substances. The sample material under test is closely coupled through a slot in a waveguide to the electric field of the standing wave in the guide. The waveguide is driven by a modulated microwave source, and differences between energy input and energy output are measured to determine moisture content in the sample as a combined function of sample dielectric constant and dielectric power loss in the sample, the particular coupling arrangement between the sample and the field through the slotted waveguide providing a calibration output measurement of moisture content which is substantially linear over a range of at least 20–70% on a wet weight basis, the variation in output readings as a function of sample fill factor being substantially logarithmic and, hence, substantially independent of sample bulk density.

BACKGROUND OF THE INVENTION

This invention relates generally to moisture measurement systems and, more particularly, to a new and improved microwave system for measuring the moisture content of granular materials.

In the field of moisture measurement, electronic moisture content determinations in solid or granular materials have generally been made utilizing any one of several methods which correlate moisture content with either dielectric constant measurements, dielectric power loss measurements, or ohmic resistance measurements. These various measurements can be made over a broad frequency spectrum, and are typically made at selected frequencies which provide the best measurements response for changes in moisture content of the particular sample material under investigation and for the particular moisture content range of interest.

Measurements of the dielectric properties of granular materials are typically made electronically by coupling an electrostatic field to the test material by means of a measurement capacitor. This measurement capacitor may take the form of a coaxial chamber wherein the dielectric test sample to be measured fills the chamber, or the measurement capacitor may be in the form of a fringe field capacitor into which a fixed amount of test material is inserted.

Assuming the ideal situation wherein the measured capacity of a parallel plate measurement capacitor (neglecting fringing effects) is examined, it will be apparent that, as the space between the capacitor plates is filled with sections of identical size and shape of a material having a uniform dielectric constant, a substantial uncertainty exists in the measured capacity across the parallel plates as a function of the amount of material inserted between the plates. This uncertainty results from the differences in orientation of various dielectric sections between the capacitor plates. In this regard, if the spaces between the capacitor plates si filled with successive planar slices, parallel to the planes of the capacitor plates and stacked one by one adjacent one of the plates until the capacitor is completely full, the ratio of percentage of fill (herein defined as "fill factor") to measured capacitance is essentially an exponential or square law relationship. However, if the planar dielectric slices are placed one by one in the space between the capacitor plates, with the plane of each slice perpendicular to the planes of the capacitor plates, the fill factor characteristic as a function of measured capacitance is essentially a linear relationship.

In practice, however, a granular material of nonuniform size and shape fills the region between the capacitor plates only to some indefinite percentage of the total fill possible, due to air entrainment between the individual granules. Hence, for fill factors typically less than 100%, a large uncertainty in measured capacitance and, hence, measured moisture content, will exist due to particle orientation and packing characteristics, and the fill factor versus measured capacitance characteristic will be represented by some curve lying between a substantially exponential function and a linear function. Of course, in all three instances, the fill factor curve is such that uncertainty in the fill factor introduces a substantial uncertainty in the interpretation of output capacitance measurements, and, hence, in the determination of moisture content.

Typical of granular materials characterized by nonuniform particle size, shape and orientation, and which require moisture content determinations, are wood chips of the type used in the manufacture of pulp for making paper or of the type used in the manufacture of particle board. Such chip samples vary so widely in volume that it is generally necessary to accurately control the bulk density of a chip sample by pressurization or other materials handling means in order to preserve the repeatability of accurate dielectric measurements. Unforunately, however, such special materials handling means for wet wood chips requires cumbersome and expensive auxiliary equipment.

Hence, those concerned with the development and use of continuous moisture measurement systems for granular materials have long recognized the need for accurate, reliable means of measuring moisture content, which is realtively insensitive to bulk density or fill factor and consequently obviates the need for special handling equipment or special treatment of test samples. The present invention fulfills this need.

SUMMARY OF THE INVENTION

Briefly, and in general terms, the present invention provides a moisture measurement system including means for introducing microwave energy at a selected frequency into a waveguide, means for closely coupling a sample of granular material to the electric field of the microwave mode via a slot in the waveguide, and means for measuring the change in output energy from the waveguide as a function of both sample dielectric constant and sample dielectric power loss to correlate the measured changes with the moisture content of the granular sample.

More particularly, by way of example and not by way of limitation, the invention involves the provision of means for applying microwave energy, modulated at a relatively low frequency, to a slotted rectangular waveguide permitting propagation of standing waves in the $TE_{0,1}$ mode. A rectangular slot is provided in the broad face of the waveguide, and the guide is tuned to proviide a desired VSWR (voltage standing wave ratio). The waveguide slot is covered with a thin sheet of a relatively low loss, low dielectric constant material, and the granular material being tested is introduced onto this cover sheet over the slot, whereby the test material is closely coupled to the electric field of the standing wave within the waveguide. Changes in phase and amplitude of the standing wave, due to the dielectric constant of the sample and dielectric power loss in the sample, are detected and provide a measure of the moisture content of the sample.

The calibration output of the system is substantially linear over a range of at least 20–70% on a wet weight basis for such materials as wet wood chips and the like, wet weight basis being defined as the difference between the wet and dry weight of the sample divided by the wet weight of the sample. The system also provides an output versus fill factor characteristic which is substantially logarithmic and, hence, substantially independent of sample bulk density. As a result, there is less uncertainty in the reliability of measurements of the dielectric properties of the sample materials and, hence, the need for special handling means to insure uniform bulk density of the sample is substantially obviated.

Moreover, measurements with the system of the present invention can be made on line and continuously, with no flow rate restrictions being imposed upon the granular material under investigation.

BRIEF DESCRIPTION OF THE DRAWING

The above and other objects and advantages of this invention will become apparent from the following more detailed description, when taken in conjunction with the accompanying drawings of an illustrative embodiment thereof, and wherein.

DESCRIPTION OF THE PREFERRED EMBODIMENT

Figure 1:
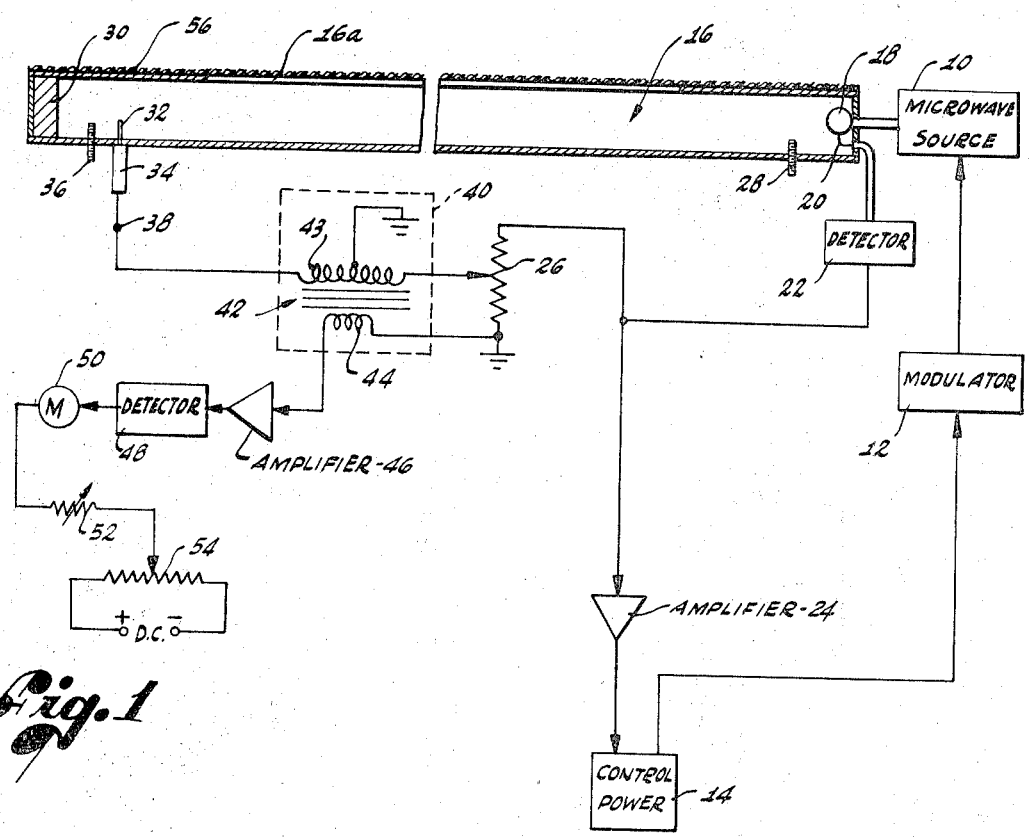
FIG. 1 is a combined electrical schematic and sectional view of a presently preferred embodiment of a microwave system for moisture content determination, in accordance with the present invention.

Referring now to the drawings, and particularly to FIG. 1 thereof, there is shown a microwave moisture measurement system which includes a microwave source 10, in the form of any well known microwave oscillator, which generates a microwave signal at a preselected operating frequency, typically 2.45 gHz. The frequency of 2.45 gHz. is not critical, but rather is selected on the basis of the largest particle or granule size expected to be encountered in the sample material whose moisture content is to be measured. It has been empirically determined that the microwave source should have a frequency which provides a wavelength which is at least three times as large as the largest particle contemplated in the test sample.

The microwave source 10 is square wave modulated at a frequency of approximately 1 kilohertz by a modulator 12 for ease of subsequent detection and amplification, and control power for driving the microwave source is provided by any stable power source 14.

The microwave source 10 is coupled to the transmitting end of a waveguide 16 by means of a loop 18. The loop 18 is of proper size and orientation to provide an impedance match to the wave guide 16 so that coupling efficiency is at a maximum and the VSWR in the guide is at a minimum.

The loop 18 within the waveguide 16 is tapped by a line 20 to direct a portion of the input energy to a crystal detector 22 or the like which detects the low frequency modulation component of the input signal and provides a reference input signal.

A portion of the electrical output from the detector 22 is directed as input to an amplifier 24, the output of the latter amplifier being directed as feedback to the power source 14. This feedback arrangement enables the power level of the input circuitry to be held essentially constant, resulting in more accurate and reliable output measurements.

The remaining portion of the output from the detector 22, which is not directed as input to the amplifier 24, is connected across a potentiometer 26 so that the reference signal can be varied in amplitude for subsequent comparison purposes.

Figure 2:
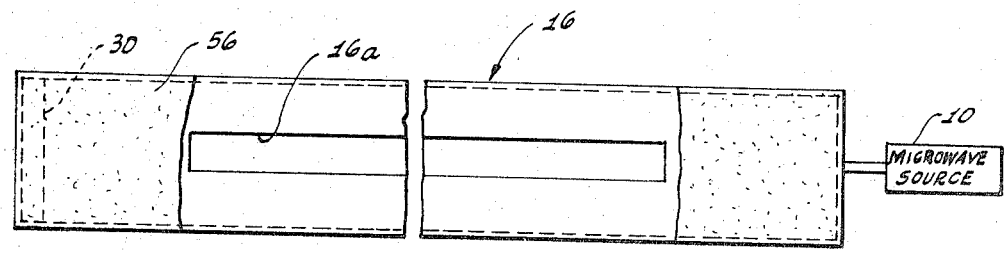
FIG. 2 is an enlarged partial plan view of the upper, slotted face of the waveguide shown in the system of FIG. 1, portions being broken away to illustrate internal structure.

The waveguide 16 is preferably rectangular in shape and is sized to permit propagation of the $TE_{0,1}$ mode within the waveguide. For a microwave operating frequency of 2.45 gHz., the inside waveguide dimensions are typically 2.15 inches in depth (the vertical dimension illustrated in FIG. 1) and 4.30 inches in width (the vertical dimension illustrated in FIG. 2). The internal length of the waveguide 16 is typically 46 inches in practice, but is not critical.

A rectangular slot 16a is provided at the center of a broad face of the waveguide 16, and the slot has typical dimensions of one inch in width and thirty-six inches in length. The size of the slot 16a may vary within limits without substantially impairing the operation of the overall system. In this regard, the slot 16a is made wide enough to permit good coupling between the electric field of the standing wave within the waveguide 16, yet must be narrow enough to enable the $TE_{0,1}$ mode of wave propagation from one end of the waveguide to the other, while also minimizing radiation from the broad face of the waveguide. It has been empirically determined that a slot width of between one-fourth and one-sixth of a wavelength at the microwave operating frequency provides a satisfactory compromise of the required conditions.

While the use of a rectangular waveguide and propagation of the $TE_{0,1}$ mode is utilized in the presently preferred embodiment of the invention, the use of other slotted waveguide shapes and other modes of wave propagation wherein the electric field vector is essentially perpendicular to the slotted waveguide face, are regarded as design variations within the general scope of the present invention.

An adjustable phase shifting stub 28 is provided in the base of the waveguide 16 and is located a distance of approximately three-quarters of a wavelength at the microwave operating frequency from the end wall of the waveguide through which the loop 18 extends.

A pad 30 of any appropriate microwave absorbing material is located adjacent the receiving end wall of the waveguide 16 to provide a waveguide termination which reduces unwanted standing wave forming reflections which would otherwise occur at a reflecting waveguide termination.

A voltage probe 32 and associated crystal detector 34, together with a parasitic tuning stub 36, are located adjacent the receiving end of the waveguide 16. The stub 36 is located one-quarter of a wavelength from the probe 32, and the entire combination of probe, detector 34, and stub are movable as a unit relative to the receiving end wall of the waveguide 16.

The depth of insertion of the parasitic stub 36 into the waveguide 16 is adjustable to alter the VSWR by causing reflections of propagating waves in proportion to the length of the stub extending into the waveguide. In addition to adjustment of the VSWR, the stub 36 is used to adjust the phase relationship of the standing wave pattern within the waveguide with respect to the voltage probe 32.

It is well known in the electrical arts that a properly sized and oriented slot in the wall of a waveguide can act as a radiating element, and that properly phased slots (e.g., on the broad face of the waveguide) can be made to radiate microwave energy in a beam of controlled width and direction with respect to the waveguide.

By way of theoretical explanation of the operation of the present invention, and not by way of limitation, it is presently believed that the single, relatively wide slot 16a in the broad face of the waveguide 16, behaves as though it were a multitude of improperly dimensioned and incorrectly phased slot antennas. These disoriented slot antennas prevent any net substantial radiation to free space due to a very high mismatch between free space and the waveguide.

When a granular material, e.g., such as wet wood chips or other cellulose based substances exhibiting a high dielectric constant and a high dielectric power loss factor by virtue of its moisture content, is brought into relatively close proximity to the slot 16a, two reactions occur. The mismatch between the slot 16a and the granular material is reduced due to the high power loss factor of the granular material, and some power from the waveguide 16 leaks into the absorbing test sample where it is dissipated. In addition, a phase shift in the standing wave pattern within the waveguide 16 occurs as a result of coupling a high dielectric constant material to the slot 16a. Empirically, it has been determined that, for best results, the proximity of the test sample material to the slot 16a should be one-quarter of a wavelength or closer.

The voltage probe 32 at the receiving end of the waveguide 16 senses any phase shift that occurs in the standing wave pattern as a result of the dielectric loading at the slot 16a, by sensing the change in voltage level induced by the change of phase. In addition, the power leaking from the waveguide 16 through the slot 16a and being absorbed in the granular test sample, causes an additional decrease in the average voltage level sensed by the probe 32 at the receiving end of the waveguide.

For standing waves along a transmission line, the mathematical description of the incident wave is as follows:

$$E_1 = a \sin (kx - \omega t) \quad (1)$$

where:

$E_1$ is the instantaneous value of the incident wave voltage,
$a$ is the maximum amplitude of the incident wave voltage, and
$kx$ is the position of the standing wave pattern along the waveguide.

The reflected wave is mathematically described as follows:

$$E_2 = b \sin (kx + \omega t) \quad (2)$$

where:

$E_2$ is the instantaneous value of the reflected wave voltage, and
$b$ is the maximum amplitude of the reflected wave voltage.

The sum of the incident and reflected waves yields a standing wave pattern which is mathematically expressed as:

$$E_1 + E_2 = [(a+b) \sin kx] \cos \omega t - [(a-b) \cos kx] \sin \omega t \quad (3)$$

Phase shift occurring in the waveguide causes the voltage $E_1 + E_2$ to vary in accordance with the term $kx$ in moving along the waveguide from the transmitting end to the receiving end. In addition, the amplitude of the standing wave ratio is also effected by the term $b$, the magnitude of $b$ being adjustable by adjustment of the stubs 28 and 36.

It has been discovered, in accordance with this invention, that by carefully adjusting the standing wave pattern in the waveguide, and by locating the voltage probe 32 at the correct point along the standing wave pattern, the contribution to the detected signal output at 38 as a function of phase shift due to dielectric constant change with moisture content can be made to cancel the essentially square law effect due to the power loss contribution to signal output. The net result is essentially a linear response for moisture content versus output signal measured at 38 over a wide moisture content range.

The output signal from the detector 34, i.e., the signal at 38, is directed as one input to a differential amplifier 40, the other input to the differential amplifier being a reference signal obtained by tapping off a portion of the voltage appearing across the potentiometer 26. The differential amplifier 40 may take any appropriate form known in the art, and by way of example, is shown in FIG. 1 as a transformer 42.

The detected output signal from the voltage probe 32 is fed to one side of a center tapped primary 43 of the transformer 42, while the reference signal from the potentiometer 26 is fed to the opposite side of the center tapped primary. The center tap of the primary winding 43 is grounded.

The secondary winding 44 of the transformer 42 provides a signal which is proportional to the difference between the reference signal and the output signal from the waveguide 16. The output from the transformer 42, as measured at the secondary winding 44, is adjusted to a relatively low level by adjusting the potentiometer 26 so that the portion of the reference signal fed to the transformer is slightly greater than the waveguide output signal when there is no granular sample material in close proximity with the slot 16a.

The output from the transformer 42 is fed to an amplifier 46, the output of the amplifier being rectified by a detector 48. This rectified output is then directed to a D.C. indicating meter 50.

The D.C. meter 50 is connected through a variable resistance 52 to a zero adjustment potentiometer 54 which is, in turn, connected across a small fixed D.C. voltage source. Adjustment of the resistance 52 varies the sensitivity of the meter 50, whereas adjustment of the potentiometer 54 provides a D.C. bucking voltage to zero the meter 50.

In order to apply a sample of granular material or, if desired, a continuous stream of granular material over the slot 16a in very close proximity to the slot, yet prevent any of the granular material from falling into the waveguide through the slot, a thin sheet 56 of a suitable low loss, low dielectric constant material is placed over the broad face of the waveguide. A typical material which has proven satisfactory for the sheet 56 is epoxy-glass.

Adjustment of the overall microwave moisture measuring system, prior to making measurements, is as follows:

(1) The position of the loop 18 is first adjusted for a minimum VSWR, as manifested by a minimum change in the reference signal by loading of the waveguide at the slot 16a or internally.

(2) The stub 28 is then adjusted to extend into the waveguide to a depth equal to approximately one-eighth of a wavelength at the microwave source frequency.

(3) The probe 32 and detector 34, together with the associated stub 36, are moved as a unit along the waveguide 16, and the depth of insertion of the stub 36 into the waveguide is varied, to obtain a maximum output signal at point 38.

(4) The stub 36, probe 32 and detector 34 are then moved towards the waveguide pad 30 until the electrical output measured at 38 is reduced to approximately 30% of the previously determined maximum output signal in Step 3.

(5) The waveguide 16 is then loaded at the slot 16a with a standard test material, and the stub 36 is adjusted to further reduce the output signal at 38 to approximately 85–90% of its reduced maximum value in Step 4.

(6) A second test standard, with more loss than the first test sample, is then used to load the waveguide 16 at the slot 16a, and the stub 28 is adjusted to bring about linear correlation in the output at 38 for the two test standards.

(7) The potentiometer 26 is then adjusted to a proper level to provide normal system operation, i.e., to insure the detector 48 is operating in the linear region.

(8) The D.C. meter 50 is zeroed by adjustment of the potentiometer 54, and the resistance 52 is adjusted to provide proper sensitivity of the meter so that readings of the meter with the standards in place provide the desired scale indications of moisture content.

The moisture measurement system of the present invention provides a measured output versus fill factor curve which is substantially logarithmic and, hence, substantially independent of sample bulk density, so that special handling means for the materials tested are substantially obviated. In addition, the calibration output of the system is substantially linear over a range of at least 20–70% on a wet weight basis for such granular materials as wet wood chips and the like.

It will be apparent from the foregoing that, while a particular form of the invention has been illustrated and described, various modifications can be made without departing from the spirit and scope of the invention. Accordingly, it is not intended that the invention be limited, except as by the appended claims.

We claim:

1. A system for measuring the moisture content of granular materials, comprising:
   microwave source, the frequency of said source being selected to provide a wavelength at least three times as large as the largest particle in the granular material to be tested;
   means for stabilizing the electrical power output of said microwave source;
   means for modulating the electrical output of said microwave source at a relatively low frequency;
   a rectangular waveguide having a transmitting end and a receiving end, the receiving end being closed, said waveguide having a single slot defined in a broad face thereof, said slot being dimensioned to normally minimize radiation from said waveguide through said slot;
   a microwave absorbing medium within said waveguide adjacent said receiving end;
   means for coupling the modulated electrical output of said microwave source to the transmitting end of said waveguide, to propagate energy in said waveguide in the $TE_{0,1}$ mode, with the electric field vector perpendicular to said broad face of said waveguide in which said slot is located;
   means for adjusting the phase and the amplitude of the standing wave pattern within said waveguide;
   means adjacent said receiving end of said waveguide for sensing changes in phase and amplitude of said standing waves and providing an output signal responsive thereto;
   means for sampling a portion of the modulated microwave energy input to said transmitting end of said waveguide to provide a reference signal;
   differential sensing means for receiving as inputs said reference signal and said output signal to provide an electrical output proportional to the difference between said signals; and
   indicating means responsive to the electrical output from said differential sensing means for indicating the magnitude thereof.

2. A system as set forth in claim 1, wherein said slot is of a width between one-fourth and one-sixth of a wavelength at the frequency of the microwave source.

3. A system as set forth in claim 1, and further including a sheet of a material having a relatively low dielectric constant and relatively low dielectric loss, said sheet overlying said slot in said waveguide.

4. A moisture measurement system, comprising:
   a microwave source;
   means for stabilizing said microwave source to provide a constant electrical energy output level;
   a waveguide having a transmitting end and a receiving end, said waveguide having a single slot defined in a wall thereof, said slot being dimensioned and located to normally provide substantially no radiation to free space from said waveguide through said slot;
   means for coupling the electrical output of said microwave source to the transmitting end of said waveguide to propagate electrical energy in said waveguide with the electric field vector perpendicular to said wall of said waveguide in which said slot is located;
   means for maintaining the material whose moisture is to be measured adjacent said slot to closely couple the material to the electric field within the waveguide;
   means adjacent said receiving end of said waveguide for sensing changes in amplitude of the electrical energy at the receiving end of said waveguide and providing an output signal responsive thereto; and
   indicating means responsive to the output signal from said sensing means for indicating the magnitude thereof and thereby indicating the moisture content of the material.

5. A system as set forth in claim 4, wherein the system is adapted for measuring the moisture content of granular materials by selecting the frequency of said source to provide a wavelength at least three times as large as the largest particle in the granular material to be tested.

6. A system as set forth in claim 4, and further including means for adjusting the phase and the amplitude of the standing waves within said waveguide.

7. A system as set forth in claim 6, wherein said sensing means senses changes in phase and amplitude of said standing waves and said output signal is responsive thereto.

8. A system as set forth in claim 4, and further including:
   means for sampling a portion of the microwave energy input to said transmitting end of said waveguide to provide a reference signal; and
   differential sensing means for receiving as inputs said reference signal and said output signal to provide an electrical output proportional to the difference between said signals, said indicating means being responsive to the electrical output from said differential sensing means for indicating the magnitude thereof.

References Cited

UNITED STATES PATENTS

| | | | |
|---|---|---|---|
| 2,580,155 | 12/1951 | Brannen | 324—58(A)UX |
| 3,079,552 | 2/1963 | Walker | 324—58.5(A) |
| 3,162,807 | 12/1964 | Alford | 324—58.5(B) |

RUDOLPH V. ROLINEC, Primary Examiner

M. J. LYNCH, Assistant Examiner

UNITED STATES PATENT OFFICE
CERTIFICATE OF CORRECTION

Patent No. 3,553,573         Dated January 5, 1971

Inventor(s) John W. Lundstrom et al.

It is certified that error appears in the above-identified patent and that said Letters Patent are hereby corrected as shown below:

In the heading to the printed specification, after line insert -- assignors to Moisture Register Company, Alhambra, Calif., a corporation of California --.

Signed and sealed this 25th day of May 1971.

(SEAL)
Attest:

EDWARD M. FLETCHER, JR.
Attesting Officer

WILLIAM E. SCHUYLER, JR
Commissioner of Patents